(12) United States Patent
Yi et al.

(10) Patent No.: US 11,047,763 B2
(45) Date of Patent: Jun. 29, 2021

(54) AUTOMATIC METHOD FOR TRACKING STRUCTURAL MODAL PARAMETERS

(71) Applicant: Dalian University of Technology, Liaoning (CN)

(72) Inventors: Tinghua Yi, Liaoning (CN); Xiaomei Yang, Liaoning (CN); Chunxu Qu, Liaoning (CN); Hongnan Li, Liaoning (CN)

(73) Assignee: Dalian University of Technology, Liaoning (CN)

( * ) Notice: Subject to any disclaimer, the term of this patent is extended or adjusted under 35 U.S.C. 154(b) by 176 days.

(21) Appl. No.: 16/342,954

(22) PCT Filed: Mar. 12, 2018

(86) PCT No.: PCT/CN2018/078700
§ 371 (c)(1),
(2) Date: Apr. 17, 2019

(87) PCT Pub. No.: WO2019/173943
PCT Pub. Date: Sep. 19, 2019

(65) Prior Publication Data
US 2020/0033226 A1    Jan. 30, 2020

(51) Int. Cl.
*G01M 5/00* (2006.01)
(52) U.S. Cl.
CPC ........ *G01M 5/0066* (2013.01); *G01M 5/0008* (2013.01)
(58) Field of Classification Search
CPC .... G01M 5/0066; G01M 5/0008; G06F 17/16
See application file for complete search history.

(56) References Cited

U.S. PATENT DOCUMENTS

2006/0025973 A1*  2/2006  Kim ................. G05B 17/02
                                        703/2

FOREIGN PATENT DOCUMENTS

| CN | 1072771127 A | 10/2017 |
|----|----|----|
| CN | 107391818 A | 11/2017 |
| CN | 107609270 A | 1/2018 |

OTHER PUBLICATIONS

He et al., System Identification of Alfred Zampa Memorial Bridge Using Dynamic Field Test Data, 2009, Journal of Structural Engineering, ASCE, 134(1), 32 pp. (Year: 2009).*

* cited by examiner

*Primary Examiner* — Toan M Le
(74) *Attorney, Agent, or Firm* — Muncy, Geissler, Olds & Lowe, P.C.

(57) ABSTRACT

Structural health monitoring relating to an automatic method for tracking structural modal parameters. First, Natural Excitation Technique is used to transform the random responses into correlation functions and Eigensystem Realization Algorithm combined with the stabilization diagram is used to estimate modal parameters from various response segments. Then, modes from the latter response segment are classified as traceable modes or untraceable modes according to correlations between their observability vectors and subspaces of the existing reference modes. Final, traceable modes will be grouped into specified clusters with the same structural characteristics on the basis of maximum modal observability vector correlation and minimum frequency difference. Meanwhile, union of the untraceable modes and existing reference modes are updated as the new reference modes which can be applied into the next tracking process. This can track the modal parameters automatically without artificial thresholds and the specified reference modes.

1 Claim, 2 Drawing Sheets

AUTOMATIC METHOD FOR TRACKING STRUCTURAL MODAL PARAMETERS

TECHNICAL FIELD

The presented invention belongs to the field of structural health monitoring, and relates to an automatic method for tracking modal parameters of engineering structures.

BACKGROUND

Since the service performance of the structures can be reflected by the variations in structural modal parameters, it is necessary to automatically and accurately identify the modal parameters of the structures. Currently, the Ploy-reference Least Squares Complex Frequency domain method, the Stochastic Subspace Identification method and the Eigensystem Realization Algorithm are widely used in the modal identification. To capture the real-time change of modal parameters, the structural responses measured from the SHM system are divided into several sub-segments with different time history and modal parameters from each response segment will be estimated by the above identification methods. But due to the influence of excitation level, environmental interference and the algorithm robustness, the number of modes calculated from each response segment is not unique and the modes from the previous response segment cannot match with the modes from the latter segment even they are with same structural characteristics. The purpose of modal tracking technology is to ensure that the structural modes identified from different response segments can match correctly and then the phenomenon of modal intersection can be avoided.

The existing modal tracking methods mainly include three categories: 1) Manual sorting method: modal parameters estimated from the latter response segment will be classified into the groups corresponding to the modal parameters obtained from the previous response segment according to the user experience. But high workload will be led to as a result of artificial intervention. 2) The tolerance limit method: The tolerance limits of the frequency difference and Modal Assurance Criterion (MAC) will be preset based on the experience to track modes. Generally, the tolerance limits can be fixed or tuned adaptively. If the tolerance limits are set unreasonable, modes will be misclassification or missing. 3) Prediction-correction method: Predict the modal parameters of the latter response segment on the basis of perturbation theory, and then compare the predicted modal parameters with the identified modal parameters. This method is inapplicability for the practical engineering structures due to the low computational efficiency of the prediction process. Therefore, an automatic modal tracking technology without human analysis is of great engineering significance.

SUMMARY

The objective of the presented invention is to provide an automated method for tracking structural modal parameters, which can solve the problems that the inaccurate modal tracking due to unreasonable experience thresholds and mode missing due to the incomplete selection of reference modes when the modal parameters of practical engineering are extracted in real time.

An automated method for tracking structural modal parameters is proposed, which is characterized as: Use Natural Excitation Technique to transform the structural random responses into correlation functions and Eigensystem Realization Algorithm combined with the stabilization diagram are used to extract modal parameters from different response segments. The modal parameters identified from the first response segment are taken as the initial reference modes and then the singular value decomposition is performed on the observability matrix of the reference modes to obtain the reference modal subspace and its orthogonal complement subspace. According to the correlations between the modal observability vectors and the reference modal subspace, the modes estimated from the next response segment will be marked as the traceable modes or the untraceable modes. Each traceable mode will be tracked into the cluster containing the specified reference mode according to the principle of the maximum modal observability correlation (MOC) and the minimum frequency difference. Meanwhile, the reference modes for the next tracking process will be updated adaptively with the union of the existing reference modes and the untraceable modes.

The technical solution of the present invention is as follows:

The procedures of the automated modal tracking are as follows:

Step 1: Extraction of modal parameters from different response segments

Select the random responses $y(t)=[y_1(t), y_2(t), \ldots, y_z(t)]^T$, $t=1, 2, \ldots, N$ recorded from the engineering structure as the response segment h, where z means the measuring point number and N is the number of samples. Natural Excitation Technique is used to obtain the correlation function matrix $r(\tau)$ with different time delays $\tau$ $$r(\tau) = \begin{bmatrix} r_{1,1}(\tau) & r_{1,2}(\tau) & \ldots & r_{1,z}(\tau) \\ r_{2,1}(\tau) & r_{2,2}(\tau) & \ldots & r_{2,z}(\tau) \\ \vdots & \vdots & \ddots & \vdots \\ r_{z,1}(\tau) & r_{z,2}(\tau) & \ldots & r_{z,z}(\tau) \end{bmatrix} \quad (1)$$

where $r_{ij}(\tau)$ is the cross-correlation function between the measuring points i and j.

Construct the Hankel matrix $H_{ms}(k-1)$ and $H_{ms}(k)$ by the correlation functions $r(\tau)$:

$$H_{ms}(k-1) = \begin{bmatrix} r(k) & r(k+1) & \ldots & r(k+s-1) \\ r(k+1) & r(k+2) & \ldots & r(k+s) \\ \ldots & \ldots & \ldots & \ldots \\ r(k+m-1) & r(k+m) & \ldots & r(m+s+k-2) \end{bmatrix} \quad (2)$$

Set k=1, and then Eigensystem Realization Algorithm is performed on the matrix $H_{ms}(k-1)$ to calculate the modal parameters (including the system eigenvalues, frequencies, damping ratios, mode shapes and the modal observability vectors) with various modal orders, which range from the even number $\delta$ to $n_u \delta$ with the order increment of $\delta$.

Preset the tolerance limit of frequency difference $e_{f,lim}$, the tolerance limit of damping difference $e_{\xi,lim}$ and the tolerance limit of MAC $e_{MAC,lim}$. The modes which are satisfied with the three tolerance limits are considered as stable modes. Two stable modes in the successive model orders will be grouped into one cluster if their frequency difference is less than $e_{f,lim}$ and the MAC is more than $e_{MAC,lim}$. The clusters with the number of stable modes exceeds the limit $n_{tol}$ are considered as physical clusters. The averages of the modal parameters in each physical cluster are considered as the identification results of the response segment h, including the system eigenvalue $\lambda_{i,h}$, frequency $f_{i,h}$, damping ratio $\xi_{i,h}$, mode shape vector $\varphi_{i,h}$ and modal observability vector $w_{i,h}=[\varphi_{i,h}^T \lambda_{i,h}\varphi_{i,h}^T \ldots \lambda_{i,h}^{m-1}\varphi_{i,h}^T]^T$, where the superscript T indicates the transposition.

Step 2: Track the modes from various response segments

Set h=1, the $\beta$ modes estimated from the response segment h as the initial reference modes, where the frequencies $f_1=[f_{1,1}, f_{2,1}, \ldots, f_{\beta,1}]$ and the modal observability matrix $W_1=[w_{1,1}, w_{2,1}, \ldots, w_{\beta,1}]$ are respectively marked as the reference frequency vector $f_{ref}=[f_{1,ref}, f_{2,ref}, \ldots, f_{\beta,ref}]$ and the reference observability matrix $W_{ref}=[w_{1,ref}, w_{2,ref}, \ldots, w_{\beta,ref}]$.

Take singular value decomposition on the reference observability matrix $W_{ref}$ to obtain the reference modal subspace $U_1$ and its orthogonal complement subspace $U_2$:

$$W_{ref} = U\Sigma V^H = [\ U_1\ \ U_2\ ]\begin{bmatrix}\Sigma_1 & 0 \\ 0 & 0\end{bmatrix}\begin{bmatrix}V_1^H \\ V_2^H\end{bmatrix} \quad (3)$$

where the superscript H represents the complex conjugate transpose. Since the modes estimated from the same response segment are uncorrelated, the rank of the matrix $W_{ref}$ equals to the order of the reference modes.

For the response segment h=2, the $\alpha$ modes are calculated, where the frequencies $f_2=[f_{1,2}, f_{2,2}, \ldots, f_{\alpha,2}]$ and the modal observability matrix $W_2=[w_{1,2}, w_{2,2}, \ldots, w_{\alpha,2}]$. For each mode j obtained from the response segment h=2, the correlations wMOC between the modal observability vector $w_{j,2}$ and the reference modal subspace $U_1$ as well as the orthogonal complement subspace $U_2$ are respectively calculated as:

$$wMOC(U_1,w_{j,2})=\cos^2(\square[U_1,w_{j,2}]) \quad (4)$$

$$wMOC(U_2,w_{j,2})=\cos^2(\square[U_2,w_{j,2}]) \quad (5)$$

where $\square$ indicates the angle between the subspace and the vector.

If $wMOC(U_1, w_{j,2}) \geq wMOC(U_2, w_{j,2})$, mode j will be marked as traceable, otherwise mode j will be marked as untraceable. Assuming that $\eta$ ($\eta \leq \alpha$) modes can be selected as traceable modes from the $\alpha$ identified modes, the remaining $\alpha-\eta$ modes are untraceable. The frequencies and the modal observability matrix of the traceable modes are respectively reformulated as $\tilde{f}_2=[\tilde{f}_{1,2}, \tilde{f}_{2,2}, \ldots, \tilde{f}_{\eta,2}]$ and $\tilde{W}_2=[\tilde{w}_{1,2}, \tilde{w}_{2,2}, \ldots, \tilde{w}_{\eta,2}]$. The traceable mode l from the response segment h=2 and the reference mode $\chi$ will be grouped into one cluster if they satisfy:

$$\frac{|f_{\chi,ref}-\tilde{f}_{\ell,h}|}{\max(f_{\chi,ref},\tilde{f}_{\ell,h})} \leq \frac{|f_{i,ref}-\tilde{f}_{\ell,h}|}{\max(f_{i,ref},\tilde{f}_{\ell,h})}\ i=1,2,\ldots,\beta \quad (6)$$

$$\frac{|f_{\chi,ref}-\tilde{f}_{\ell,h}|}{\max(f_{\chi,ref},\tilde{f}_{\ell,h})} \leq \frac{|f_{\chi,ref}-\tilde{f}_{k,h}|}{\max(f_{\chi,ref},\tilde{f}_{k,h})}\ k=1,2,\ldots,\eta \quad (7)$$

$$MOC(w_{\chi,ref},\tilde{w}_{\ell,h}) \geq MOC(w_{i,ref},\tilde{w}_{\ell,h})\ i=1,2,\ldots,\beta \quad (8)$$

$$MOC(w_{\chi,ref},\tilde{w}_{\ell,h}) \geq MOC(w_{\chi,ref},\tilde{w}_{k,h})\ k=1,2,\ldots,\eta \quad (9)$$

where MOC indicates the correlation of two modal observability vectors.

The union of the $\alpha-\eta$ untraceable modes and the existing reference modes are updated as the new reference modes which can be used for the next tracking. The new reference frequency vector and the new reference modal observability matrix can be respectively expanded as $f_{ref}=[f_{1,ref}, f_{2,ref}, \ldots, f_{\beta,ref}, f_{\beta+1,ref}, \ldots, f_{\beta+\alpha-\eta,ref}]$ and $W_{ref}=[w_{1,ref}, w_{2,ref}, \ldots, w_{\beta,ref}, w_{\beta+1,ref}, \ldots, w_{\beta+\alpha-\eta,ref}]$. For the modal parameter from the response segments h=3, 4, . . . , the tracking procedures are the same as above.

The advantage of the invention is that the modal parameters can be tracked accurately and automatically where the reference modes are not required to be specified and no manual analysis or thresholds are required in the tracking process.

DETAILED DESCRIPTION

The present invention is further described below in combination with the technical solution.

Figure 1:
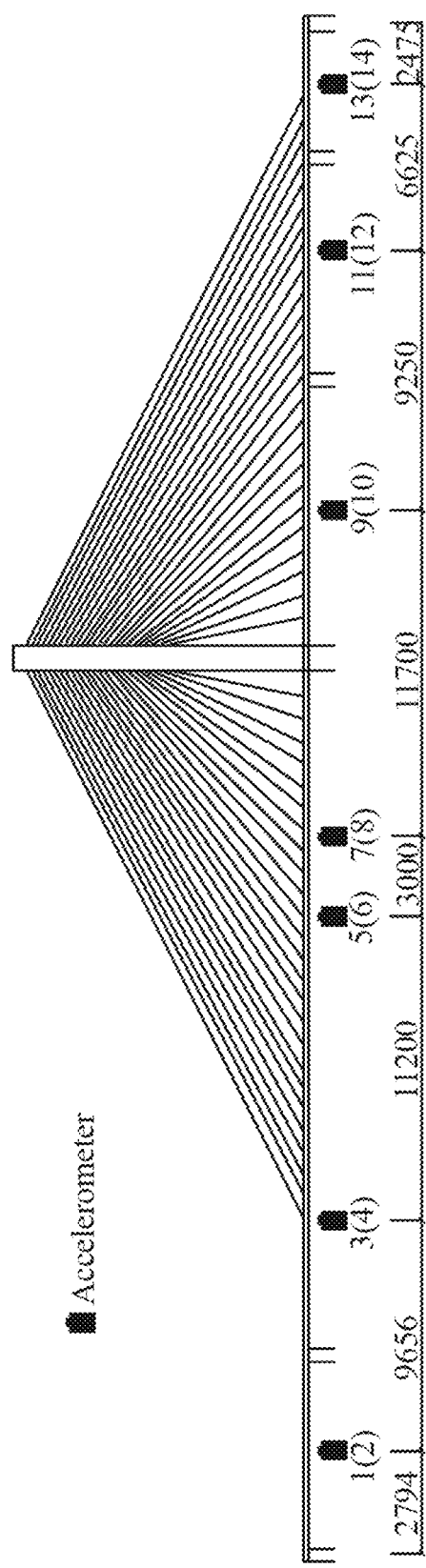
FIG. 1 is the layout of vertical acceleration sensors for the main girder of a bridge.

As shown in FIG. 1, fourteen acceleration sensors are installed on the main girder of the bridge. The vertical acceleration responses under ambient excitation are recorded from Sep. 1, 2016 to Sep. 7, 2016 with the sampling frequency of 100 Hz. One hour responses are determined as a response segment for modal identification.

The procedures are described as follows:

(1) The structural random responses at 0:00-1:00 on Sep. 1, 2016 are determined as the response segment h=1, which can be represented as $y(t)=[y_1(t), y_2(t), \ldots, y_{14}(t)]^T$, t=1, 2, . . . , N. Then Natural Excitation Technique is used to obtain the correlation function matrix with different time delays, shown in Eq. (1).

(2) Set m=250, s=250. The correlation functions $r(\tau)$ with $\tau$=1~499 and $\tau$=2~500 are respectively used to build Hankel matrices $H_{ms}(0)$ and $H_{ms}(1)$, shown in Eq. (2).

(3) Set the minimum model order as $\delta$=4, $n_u$=70, and then the model order ranges to 280 with the order increment of $\delta$=4. Eigensystem Realization Algorithm is performed on the Hankel matrices $H_{ms}(0)$ and $H_{ms}(1)$ to obtain the modal parameters from different model orders.

(4) Set the tolerance limits of the frequency difference, the damping difference and MAC as $e_{f,lim}$=5%, $e_{\xi,lim}$=20% and $e_{MAC,lim}$=90%, respectively. Modes which satisfy with the three tolerance limits are considered as stable modes. Two stable modes in the successive model orders will be grouped into one cluster if their frequency difference is less than $e_{f,lim}$ and the MAC is more than $e_{MAC,lim}$. The physical clusters are those with the number of stable modes exceeds the limit $n_{tol}$=0.5$n_u$. The averages of the modal parameters in each physical cluster are considered as the identification results. Thus the $\beta$=15 modes with their frequencies less than 2.5 Hz are estimated as the initial reference modes, where the reference frequencies are $f_{1,ref}$=0.387 Hz, $f_{2,ref}$=0.648 Hz, $f_{3,ref}$=0.754 Hz, $f_{4,ref}$=0.932 Hz, $f_{5,ref}$=0.985 Hz, $f_{6,ref}$=1.060 Hz, $f_{7,ref}$=1.278 Hz, $f_{8,ref}$=1.321 Hz, $f_{9,ref}$=1.513 Hz, $f_{10,ref}$=1.605 Hz, $f_{11,ref}$=1.685 Hz, $f_{12,ref}$=1.954 Hz, $f_{13,ref}$=2.000 Hz, $f_{14,ref}$=2.038 Hz, $f_{15,ref}$=2.212 Hz.

(5) The $\alpha$=16 modes are identified from the response segment h=2, where the frequencies are $f_{1,2}$=0.386 Hz, $f_{2,2}$=0.644 Hz, $f_{3,2}$=0.755 Hz, $f_{4,2}$=0.929 Hz, $f_{5,2}$=0.983 Hz, $f_{6,2}$=1.061 Hz, $f_{7,2}$=1.257 Hz, $f_{8,2}$=1.318 Hz, $f_{9,2}$=1.503 Hz, $f_{10,2}=1.595$ Hz, $f_{11,2}=1.676$ Hz, $f_{12,2}=1.949$ Hz, $f_{13,2}=1.998$ Hz, $f_{14,2}=2.033$ Hz, $f_{15,2}=2.220$ Hz, $f_{16,2}=2.253$ Hz.

Figure 2:
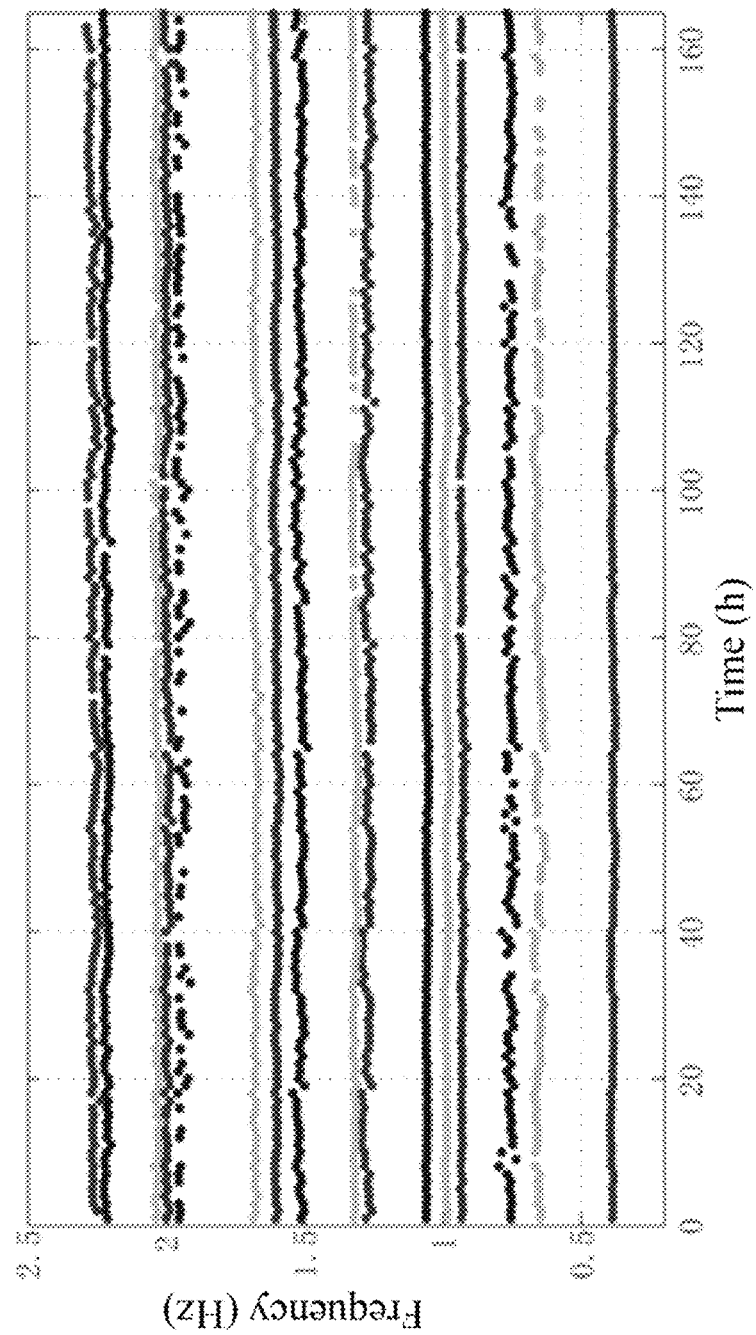
FIG. 2 is the results of automatically tracking the modal parameters of the main girder.

(6) Singular value decomposition is performed on the reference modal observability matrix $W_{ref}$ to obtain the reference modal subspace $U_1$ and its orthogonal complement subspace $U_2$. The correlations between modes identified from the response segment h=2 and the modal subspaces $U_1$ and $U_2$ are calculated, respectively. Modes j=1, ..., 15 can be tracked by Eqs. (6-9) since $wMOC(U_1, w_{j,2}) \geq wMOC(U_2, w_{j,2})$ is satisfied. Mode j=16 is untraceable as a result of $wMOC(U_1, w_{j,2}) < wMOC(U_2, w_{j,2})$ where $wMOC(U_1, w_{16,2})=0.238$ and $wMOC(U_2, w_{16,2})=0.762$. Then mode j=16 will be added into the existing reference mode list for the next tracking. The number of reference modes is 16 with $f_{16,ref}=2.253$ Hz. For the response segments h=3, 4, ..., repeat steps (1-4) to identify modal parameters and repeat step (6) to track modes. The tracking results are shown in FIG. 2.

The invention claimed is:

1. An automatic method for tracking structural modal parameters, wherein:

step 1: extraction of modal parameters from different response segments select the random responses $y(t)=[y_1(t), y_2(t), \ldots, y_z(t)]^T$, t=1, 2, ..., N recorded from acceleration sensors installed on an engineering structure as the response segment h, where z means a measuring point number and N is a number of samples; Natural Excitation Technique is used to obtain a correlation function matrix $r(\tau)$ with different time delays $\tau$ $$r(\tau) = \begin{bmatrix} r_{1,1}(\tau) & r_{1,2}(\tau) & \ldots & r_{1,z}(\tau) \\ r_{2,1}(\tau) & r_{2,2}(\tau) & \ldots & r_{2,z}(\tau) \\ \vdots & \vdots & \ddots & \vdots \\ r_{z,1}(\tau) & r_{z,2}(\tau) & \ldots & r_{z,z}(\tau) \end{bmatrix} \quad (1)$$

where $r_{ij}(\tau)$ is a cross-correlation function between the measuring points i and j;

construct Hankel matrix $H_{ms}(k-1)$ and $H_{ms}(k)$ by the correlation functions $r(\tau)$:

$$H_{ms}(k-1) = \begin{bmatrix} r(k) & r(k+1) & \ldots & r(k+s-1) \\ r(k+1) & r(k+2) & \ldots & r(k+s) \\ \ldots & \ldots & \ldots & \ldots \\ r(k+m-1) & r(k+m) & \ldots & r(m+s+k-2) \end{bmatrix} \quad (2)$$

set k=1, and then Eigensystem Realization Algorithm is performed on the matrix $H_{ms}(k-1)$ to calculate modal parameters with various modal orders, including the system eigenvalues, frequencies, damping ratios, mode shapes and the modal observability vectors, which range from the even number $\delta$ to $n_u\delta$ with the order increment of $\delta$;

preset a tolerance limit of frequency difference $e_{f,lim}$, a tolerance limit of damping difference $e_{\xi,lim}$ and a tolerance limit of Modal Assurance Criterion (MAC) $e_{MAC,lim}$; the modes which are satisfied with the three tolerance limits are considered as stable modes; two stable modes in successive model orders will be grouped into one cluster if their frequency difference is less than $e_{f,lim}$ and the MAC is more than $e_{MAC,lim}$; clusters with a number of stable modes exceeds the limit $n_{tol}$ are considered as physical clusters; the averages of the modal parameters in each physical cluster are considered as the identification results of a response segment h, including the system eigenvalue $\lambda_{i,h}$, frequency $f_{i,h}$, damping ratio $\xi_{i,h}$, mode shape vector $\varphi_{i,h}$ and modal observability vector $w_{i,h}=[\varphi_{i,h}^T \, \lambda_{i,h} \varphi_{i,h}^T \, \ldots \, \Delta_{i,h}^{m-1}\varphi_{i,h}^T]^T$, where the superscript T indicates the transposition;

step 2: track the modes from various response segments set h=1, the $\beta$ modes estimated from the response segment h as initial reference modes, where frequencies $f_1=[f_{1,1}, f_{2,1}, \ldots f_{\beta,1}]$ and a modal observability matrix $W_1=[w_{1,1}, w_{2,1}, \ldots, w_{\beta,1}]$ are respectively marked as the reference frequency vector $f_{ref}=[f_{1,ref}, f_{2,ref}, \ldots, f_{\beta,ref}]$ and the reference observability matrix $W_{ref}=[w_{1,ref}, w_{2,ref}, \ldots, w_{\beta,ref}]$;

take singular value decomposition on the reference observability matrix $W_{ref}$ to obtain a reference modal subspace $U_1$ and its orthogonal complement subspace $U_2$:

$$W_{ref} = U\Sigma V^H = \begin{bmatrix} U_1 & U_2 \end{bmatrix} \begin{bmatrix} \Sigma_1 & 0 \\ 0 & 0 \end{bmatrix} \begin{bmatrix} V_1^H \\ V_2^H \end{bmatrix} \quad (3)$$

where the superscript H represents the complex conjugate transpose; since the modes estimated from the same response segment are uncorrelated, the rank of the matrix $W_{ref}$ equals to the order of the reference modes;

for the response segment h=2, the $\alpha$ modes are calculated, where the frequencies $f_2=[f_{1,2}, f_{2,2}, \ldots, f_{\alpha,2}]$ and the modal observability matrix $W_2=[w_{1,2}, w_{2,2}, \ldots, w_{\alpha,2}]$; for each mode j obtained from the response segment h=2, the correlations wMOC between the modal observability vector $w_{j,2}$ and the reference modal subspace $U_1$ as well as the orthogonal complement subspace $U_2$ are respectively calculated as:

$$wMOC(U_1, w_{j,2}) = \cos^2(\square[U_1, w_{j,2}]) \quad (4)$$

$$wMOC(U_2, w_{j,2}) = \cos^2(\square[U_2, w_{j,2}]) \quad (5)$$

where $\square$ indicates the angle between the subspace and the vector;

if $wMOC(U_1, w_{j,2}) \geq wMOC(U_2, w_{j,2})$, mode j will be marked as traceable, otherwise mode j will be marked as untraceable; assuming that $\eta(\eta \leq \alpha)$ modes can be selected as traceable modes from the $\alpha$ identified modes, the remaining $\alpha-\eta$ modes are untraceable; frequencies and a modal observability matrix of the traceable modes are respectively reformulated as $\tilde{f}_2=[\tilde{f}_{1,2}, \tilde{f}_{2,2}, \ldots, \tilde{f}_{\eta,2}]$ and $\tilde{W}_2=[\tilde{w}_{1,2}, \tilde{w}_{2,2}, \ldots, \tilde{w}_{\eta,2}]$; the traceable mode l from the response segment h=2 and the reference mode $\chi$ will be grouped into one cluster if they satisfy:

$$\frac{|f_{\chi,ref} - \tilde{f}_{\ell,h}|}{\max(f_{\chi,ref}, \tilde{f}_{\ell,h})} \leq \frac{|f_{i,ref} - \tilde{f}_{\ell,h}|}{\max(f_{i,ref}, \tilde{f}_{\ell,h})} \, i=1, 2, \ldots, \beta \quad (6)$$

$$\frac{|f_{\chi,ref} - \tilde{f}_{\ell,h}|}{\max(f_{\chi,ref}, \tilde{f}_{\ell,h})} \leq \frac{|f_{\chi,ref} - \tilde{f}_{k,h}|}{\max(f_{\chi,ref}, \tilde{f}_{k,h})} \, k=1, 2, \ldots, \eta \quad (7)$$

$$MOC(w_{\chi,ref}, \tilde{w}_{\ell,h}) \geq MOC(w_{i,ref}, \tilde{w}_{\ell,h}) \, i=1, 2, \ldots, \beta \quad (8)$$

$$MOC(w_{\chi,ref}, \tilde{w}_{\ell,h}) \geq MOC(w_{\chi,ref}, \tilde{w}_{k,h}) \, k=1, 2, \ldots, \eta \quad (9)$$

where modal observability correlation (MOC) indicates the correlation of two modal observability vectors;

the union of the $\alpha-\eta$ untraceable modes and the existing reference modes are updated as the new reference modes which can be used for the next tracking; the new reference frequency vector and the new reference modal observability matrix can be respectively expanded as $f_{ref}=[f_{1,ref}, f_{2,ref}, \ldots, f_{\beta,ref}, f_{\beta+1,ref}, \ldots, f_{\beta+\alpha-\eta,ref}]$ and $W_{ref}=[w_{1,ref}, w_{2,ref}, \ldots, w_{\beta,ref}, w_{\beta+1,ref} \ldots w_{\beta+\alpha-\eta,ref}]$; for the modal parameter from the response segments h=3, 4, . . . , the tracking procedures are the same as above.

\* \* \* \* \*